3,592,891
METHOD OF TREATING LESIONS OF THE ORAL ORIFICE

Sam J. Dawson and James Moody Brock, Montgomery, Ala., assignors to A.Q.S., Inc., Montgomery, Ala.
No Drawing. Filed Feb. 25, 1969, Ser. No. 802,205
Int. Cl. A61r 27/00
U.S. Cl. 424—259      4 Claims

ABSTRACT OF THE DISCLOSURE

A method of treating lesions of the oral orifice which comprises contacting said lesions with a composition which includes quinine bisulfate.

---

The instant invention is directed to a method of treating lesions of the oral orifice.

In particular, the instant invention is directed to a method of treating lesions of the oral orifice, which method comprises contacting said lesions with a composition which includes quinine bisulfate. The instant invention is directed to the treatment of oral lesions which can be generally characterized as stomatitis. These lesions include those generalized skin lesions which frequently have buccal manifestations which lesions may be better particularized by their common technical names, such as lichen planus, erythema multiforme, lupus erythematosus, Behcet's syndrome, and *Pemphigus vulgaris*, and the like. In particular the instant invention is directed to those diseases which result in oral manifestations by the eruption of ulcerations within the oral cavity. While these diseases are particularly troublesome and at times extremely painful it is presently thought that if properly treated said lesions will not have serious systemic manifestations. In particular, the lesions to which the instant invention is directed are those in which ulcerations develop within the oral cavity such as herpes simplex (fever blisters) and other oral herpetic manifestations including the acute and painful vascular eruptions which occur on the vermillion borders of the lips and oral mucosa which are a direct result of the herpes simplex virus.

Herpes simplex has been characterized as a recurrent virus infection which is denoted by the appearance of small vesicles on the mucous membranes either in multiple clusters or in single clusters, which vesicles are filled with clear fluid. In the acute state of the disease multiple shallow ulcers of varying size may be found throughout the mouth. During the initial periods in which ulcerations are present, that is to say, the first four or five days, there is generally a period of extreme and acute pain. It is toward this type of lesion and other similar lesions which are the results of other microbial and viral causes to which the instant invention is directed.

Applicants have unexpectedly found that if one contacts any of the above noted lesions with a composition which includes quinine bisulfate one obtains an immediate and unexpected diminution of the symptoms which are normally associated with mouth ulcers or blisters.

Quinine bisulfate is a well known and old drug which is the bisulfite salt of an alkaloid which is conventionally contained from cinchona bark. Quinine bisulfate has the structural formula

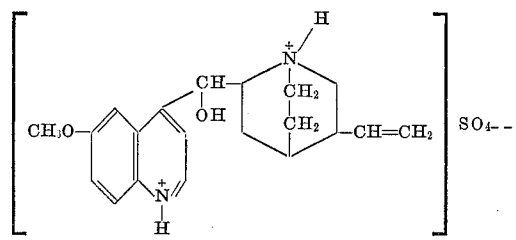

The bisulfate salt is prepared by the addition of a sufficient quantity of sulfuric acid to quinine sulfate which has been previously suspended in water. Subsequent to the addition of sulfuric acid the resulting solution is evaporated and allowed to crystallize.

The crystalline quinine bisulfate is a white or colorless crystal usually in a needle-like or white crystalline powder form. It is odorless and has an extremely bitter taste. The powder effloresces on exposure to dry air and turns yellow on exposure to light. Furthermore, solutions of quinine bisulfate are extremely acid.

The quinine bisulfate salt is employed in deference to quinine or quinine sulfate inasmuch as said salt is much more soluble and therefore, much more adaptable to the instant use. In the past, quinine bisulfate has been employed as an analgetic and antipyretic in a manner very similar to that commonly associated with salicylates and other coal tar analgetics. In addition, quinine bisulfate is known as a sclerosing agent which physiological activity is beneficial to the results obtained by the use of the product in the instant invention. Quinine bisulfate, however, has not previously been employed in the treatment of oral lesions and, in particular, in the treatment of oral lesions which are a direct result of herpes simplex.

In the method of the instant invention the quinine bisulfate is prepared in an aqueous medium in a concentration of from about 3 to about 10 percent. The aqueous composition is then applied topically to the localized areas of inflammation or ulceration so as to coat same. The application may be made by any conventional means such as by dipping a cotton swab into the aqueous medium and subsequently contacting the oral lesion with said solution. Treatment of this type is most beneficially carried on at an interval of about four times a day subsequent to which there is an immediate decrease of the pain associated with the lesion and, in addition, said lesion appears to decrease in size and the irritation correspondingly subsides.

The aqueous medium employed in connection with the quinine bisulfate of the instant invention may either be water, a buffer solution which is physiologically adjusted to a body system such as a phosphate buffer, a saline buffer, and the like. The particular vehicle employed in connection with the instant invention should be one in which the quinine bisulfate is adequately soluble and in which said quinine bisulfate is stable for a reasonable period of time so as to allow advanced preparation thereof. Therefore, the particular vehicle employed is not particularly critical to the instant invention, but, however, should be selected on the basis of its aesthetic values and commercial acceptability.

As previously noted it is unexpectedly found that one employs an aqueous preparation of quinine bisulfate by applying same topically to a localized oral lesion one obtains an almost immediate response thereto. Response is characterized by a decrease in irritation and subsequent thereto a decrease in the size and number of lesions and ultimately an elimination of the lesions entirely. There are presently available certain other treatments which are employed in connection with oral lesions. It is noted, however, that the majority of these preparations and, in particular, one of the more popular, i.e., silver nitrate, act by means of cauterizing the wound so as to form a hard coating thereover and thus, eliminate contact of same with normal body fluids and, therefore, reduce the irritation and pain associated therewith.

Commonly associated with cauterizing agents are the inherent dangers and toxicities of the drug which are employed. In particular, silver nitrate is an extremely toxic substance and the absorption of an excess thereof can be lethal. Furthermore, when silver nitrate is employed in the oral orifice there is concomitant with said use the inherent risk of swallowing which has been noted in several of the journals within the industry with statements such as "death has resulted more than once through the careless use of silver nitrate in cauterizing the mouth. The cone having slipped out of the fingers, and then been swallowed by the patient." Therefore, the method of the instant invention provides a substantial improvement over the prior art inasmuch as the quinine bisulfate employed in connection with the instant invention is not to a great extent toxic. Furthermore, while the exact mode of operation of the instant invention is unknown it it known that quinine bisulfate does not act by cauterizing or in effect killing the tissue but rather acts only by hardening same so as to permit a rapid and thorough healing thereof. The instant invention will now be illustrated by the following examples thereof, however, it is noted that said examples are provided as further illustrative materials and the instant invention should not be deemed to be limited thereby.

EXAMPLE I

A controlled study was performed so as to compare the effects of a quinine bisulfate solution in the treatment of oral lesions. Ten samples were prepared, five of which contain 6 percent quinine bisulfate in water and the other five of which contained only water. These samples were then employed in the treatment of oral lesions of various severity with the following result.

Patient 1 was treated with a sample which comprised only water for a period of six days. Water was applied topically by means of a cotton applicator four times a day for a period of six days after which time it was noted that the oral ulcers which were diagnosed as mild initially had disappeared.

Patient 2 was treated with a composition which included only water for a period of six days. The solution was applied atopically by means of a cotton applicator and after a period of ten days the blisters disappeared.

Patient 3 was treated with an aqueous solution comprising water for four days. The water was applied by means of a cotton swab to buccal ulcers four times a day. After a period of four days the patient had not improved.

Patient 4 was treated for blisters for a period of ten days with an aqueous solution which comprised only water. The solution was applied four times a day by means of a cotton swab. At the end of ten days the patient failed to respond to treatment.

Patient 5 was treated with an aqueous solution comprising only water for a period of six days for a disease diagnosed as herpes simplex. The water was applied four times a day by means of a cotton swab and after six days the disease was diagnosed as still being present.

As distinguished from the above control group the following patients were treated with a six percent aqueous solution of quinine bisulfate as will be readily appreciated by the following, the quinine bisulfate proved to be most beneficial and effective in the treatment of oral ulcers.

Patient 1 was treated for a period of eight days with a six percent quinine bisulfate solution. The quinine bisulfate solution was applied four times a day for a period of eight days, after which time the herpes simplex was completely cured. It is noted in connection with this case that the diagnosis was that of a severe herpes simplex infection, and that said infection had persisted for ten days prior to the initiation of treatment therefor.

Patient 2 was treated for nine days with a six percent quinine bisulfate solution. The solution was applied by means of a cotton swab four times a day and after four days there was a noted marked improvement. Furthermore, at the end of the ninth day of treatment the patient was diagnosed as being cured. In connection with this case it is noted that said herpes simplex was diagnosed as a severe infection with multiple lesions.

Patient 3 was treated for a period of four days with a six percent solution of quinine bisulfate. The solution was applied by means of a cotton swab four times a day. At the end of the four day course of treatment the patient was diagnosed as being completely cured.

Patient 4 was treated with a six percent quinine bisulfate solution for a period of four days. The solution was applied by means of a cotton swab and subsequent to the four day course of treatment said patient was diagnosed as being cured. In connection with this patient it is noted that the infection was diagnosed as being moderate and consisting of two lesions both of which were cured at the end of the four day course of treatment.

Patient 5 was treated for a period of eight days with a six percent quinine bisulfate solution. The solution was applied by means of a cotton swab four times a day. At the end of the course of treatment the patient was 90% improved and two days later indicated that the disease was cured.

As will readily be noted by a comparison of the controlled group to the group which was treated with the six percent quinine bisulfate solution one can only draw the conclusion that said quinine bisulfate solution is both safe and effective in the treatment of oral lesions. The medication resulted in a diminution of pain and a subsequent elimination of the physical manifestations thereof.

EXAMPLE II

Six percent quinine bisulfate solution was tested for effectiveness over a period of four months on a variety of oral ulcers consisting mainly of viral or petic ulcers on the lips and buccal mucosa. The medication was applied with a cotton swab which was held in contact with the lesion for a period of two minutes. This procedure was repeated four times a day. Subsequent to the fourth application of the medication or the end of the first day, there was a ninety percent reduction in pain throughout the sample. Within the next 24 hour period there was a gradual disappearance of the lesions themselves. Furthermore, no side effects or hypersensitivity was noted throughout the course of the study.

EXAMPLE III

Six percent quinine bisulfate solution was employed in the treatment of mouth ulcers and fever blisters. The medication was applied three times a day for a period of four days to a series of approximately twelve patients all of whom were diagnosed as having lesions of the oral orifice which were a manifestation of herpes simplex or of an unknown ideology. At the end of a four day period the vast majority of patients had been cured and after an additional two day period all of the patients were diagnosed as being cured.

As will readily be appreciated by those skilled in the art the instant invention has numerous applications in association with the treatment of herpes simplex in humans. The solution may be applied topically for a duration of from a few seconds to several minutes at a frequency of from about 1 to about 6 times a day without the danger of hypersensitivity or toxicity.

As will be noted from the above examples the medication has been tested extensively and been proven to be both safe and effective in the treatment of oral lesions.

What is claimed is:

1. A method of treating oral lesions of herpes simplex origin which comprises contacting said lesions with a 6% aqueous solution of quinine bisulfate.

2. A method of treating oral lesions of herpes simplex origin which comprises contacting said lesions with a 3–10% aqueous solution of quinine bisulfate.

3. A method of treating ulcerations within the oral cavity which comprises contacting said ulceration with a 3–10% aqueous solution of quinine bisulfate.

4. The method of claim 3 wherein the aqueous solution is a 6% aqueous solution of quinine bisulfate.

No references cited.

RICHARD L. HUFF, Primary Examiner